ABSTRACT OF THE DISCLOSURE

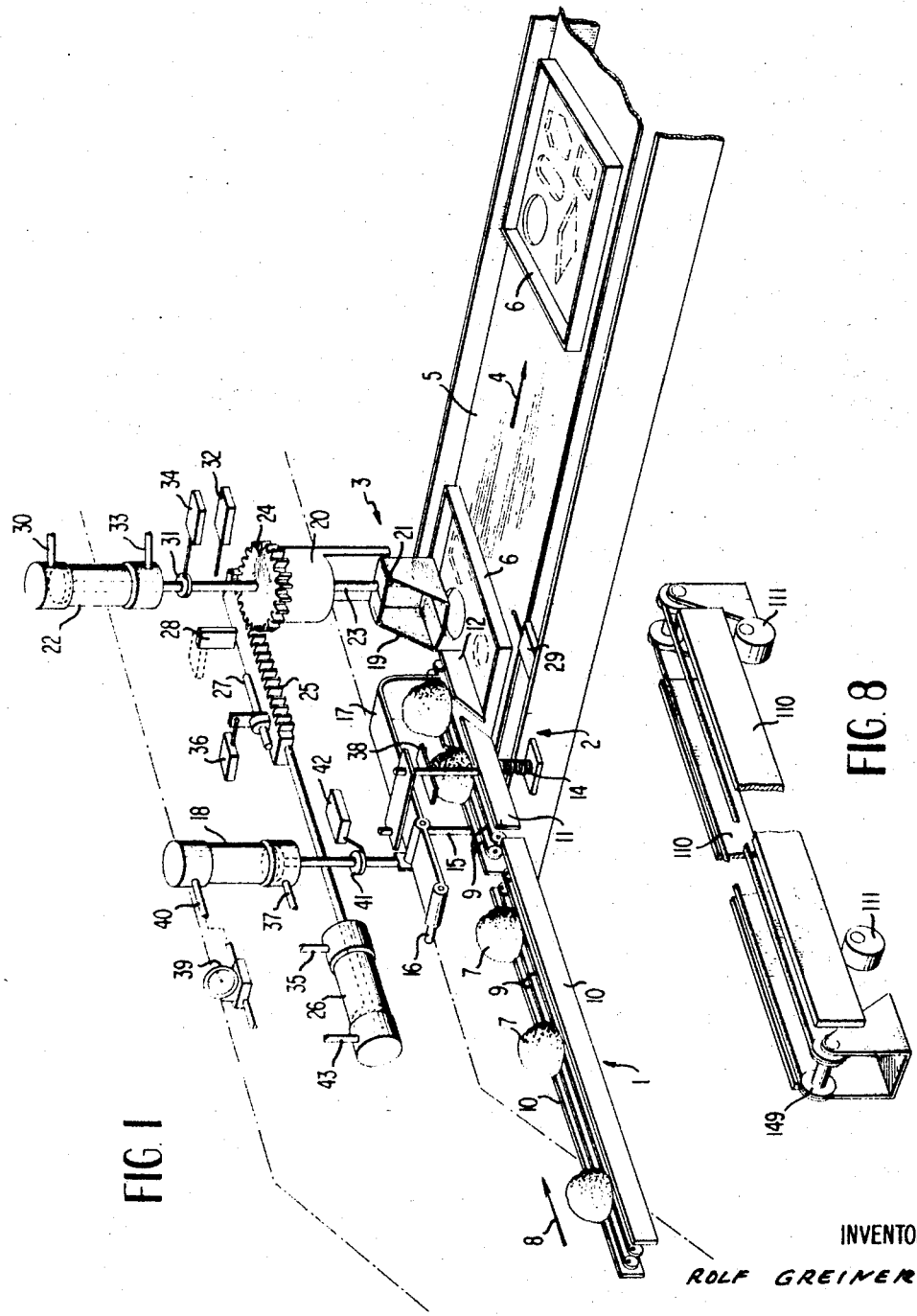
INVENTOR
ROLF GREINER

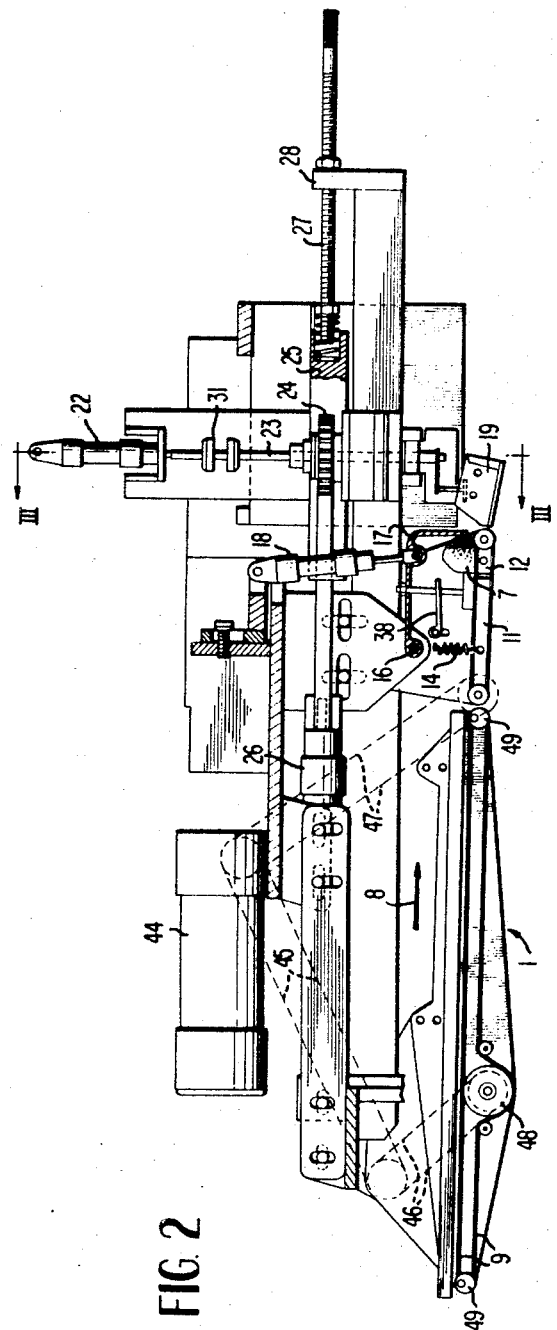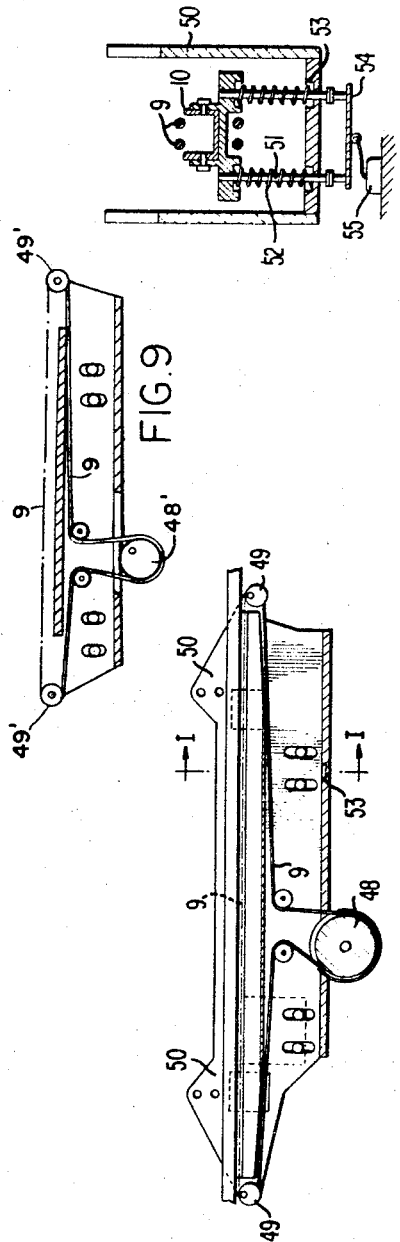
INVENTOR
ROLF GREINER
BY Craig & Antonelli
ATTORNEYS 3,444,982
DEVICE FOR HANDLING AND POSITIONING
ARTICLES WITHIN CONTAINERS
Rolf Greiner, Stuttgart-Vaihingen, Germany, assignor to
Schoko-Buck G.m.b.H., Stuttgart, Germany
Filed Feb. 15, 1967, Ser. No. 616,384
Claims priority, application Germany, Feb. 19, 1966,
Sch 38,519
Int. Cl. B65g *47/24;* B65b *5/12*
U.S. Cl. 198—33                                                     11 Claims

A mechanism for feeding individual articles, especially pieces of candy, in one direction and inserting one article at a time between positioning means in the form of cooperating supports which, if the articles have a noncircular horizontal cross section, are then pivoted at an adjustable angle about a vertical axis, whereupon the supports are separated so as to release the article and to drop the same in a particular position into a container traveling underneath the supports in a direction at an angle to the feeding direction of the articles.

Background of the invention

The present invention relates to a packing mechanism for feeding individual articles, especially pieces of candy, to a particular point by means of a conveyer belt on which they are aligned behind each other, and for then depositing them individually in certain positions into containers.

The known packing mechanisms for mechanically inserting pieces of candy into boxes, as disclosed, for example, in the German published patent application No. 1,163,729, have the disadvantage that several pieces of candy have to be picked up at the same time from a conveyer belt from above by means of gripper-shaped caps which are disposed behind each other on another belt. Apart from the fact that the pieces of candy must be disposed on the feed belt at uniform distances from each other which because of the variations in the dimensions of the pieces is almost impossible, this known mechanism especially involves the danger that the pieces of candy which are clamped in a row in the gripping caps may be crushed between the walls of these caps, especially if this candy is filled with liquid, or that they may drop out of these caps. The packing mechanisms which are presently known for this purpose are therefore not sufficiently reliable in operation.

These known packing mechanisms are furthermore only adapted for filling boxes in which the pieces of candy are arranged in individual rows adjacent to each other. However, especially in more expensive candy packages, the individual pieces of candy are generally packed in an unsymmetric arrangement which heretofore could be attained only by inserting the individual pieces by hand.

Summary of the invention

It is therefore an object of the present invention to overcome the disadvantages of the known apparatus and to provide a packing mechanism which permits candies of any shapes to be properly fed and deposited in their boxes in any desired arrangement.

For attaining this object the invention provides that an adjustable feeding conveyer which is adapted to receive and convey the pieces of candy one behind the other is provided near its end with a metering device which only permits a single piece of candy at a time to slide between a pair of cooperating supports which may be turned about an adjustable angle relative to the feeding conveyer and are adapted to be pivoted apart so as to release the individual piece and deposit the same into a candy box. The new mechanism therefore permits each individual piece of candy to be deposited in a particular position and at the particular place where it is desired in the candy box without danger that the candy will be crushed or damaged or that, while being conveyed to its particular place of deposit, the pieces will carry out any uncontrolled movements and will thereby be moved to positions which might prevent the packing mechanism from functioning properly. The cooperating supports of the mechanism are preferably equipped with a lining which tapers slightly downwardly toward the package and has a shape which is adapted to the outer shape of a candy piece so that, when each piece slides between the supports, it will be centered automatically within the support lining and may thereafter be deposited in the proper position in the candy box.

An important feature of the invention consists in the provision of moving conveying means which are adapted to feed the candies in one direction, and of supporting rails which are movable so as to lift the candies intermittently off the conveying means in order to prevent the bottom surface of the candies from rubbing for a longer time on these conveying means when the travel of the candies is slowed down or stopped, for example, due to the fact that several candies accumulate behind and in engagement with each other on the conveying means. The intermittent movement of the candies also has the advantage of preventing the adjacent pieces of candy from sticking to each other. The conveying means preferably consists of a pair of narrow parallel conveying belts which are driven continuously and are located between a pair of lateral supporting rails which are lifted by eccentric driving means at a frequency in accordance with their number of revolutions above the surface of the conveying belts on which the candies are deposited. The conveyer may, however, also be modified by mounting the supporting rails in a fixed position and by moving the conveying belts by means of eccentric drive pulleys.

Another advantageous feature of the invention consists in the provision of a very simple metering device in the form of a short additional conveyer which likewise comprises a pair of narrow conveyer belts, a pair of lateral supporting rails at both sides of these belts, a stop member for stopping one of the candies and thereafter releasing it for its insertion into the cooperating supports, and a braking device behind the stop member and spaced at a distance therefrom substantially equal to the length of a candy, as seen in its direction of travel. When the stop member is moved so as to release the first candy adjacent thereto, the braking device stops the travel of the next-following candy and thus insures that only one candy at a time can slide between the cooperating supports. The stop member may consist of a simple angular lever which may be pivoted upwardly by the movements of a piston in a pneumatic or hydraulic cylinder so as to release a candy toward the cooperating supports and simultaneously also actuates the braking device. The supporting rails of the metering device are preferably divided in length into two sections, and the rail section adjacent to the cooperating supports is mounted in a fixed position, while the other rail section adjacent to the feeding conveyer is pivotable upwardly, preferable by the pivotable stop lever, so that when the stop lever is lifted so as to release the first candy toward the cooperating supports, the next candy or candies will be lifted off the conveying belts and thus prevented from further moving toward the cooperating supports. In addition, a fixed brake plate may be mounted above the pivotable supporting rails in such a position that, when these rails are pivoted upwardly, the upper side of a candy will engage with a slight pressure against the brake plate. This metering device will function very accurately especially if the fixed section of the supporting rails has a length approximately equal to the length of one of the candies, as seen in the feeding direction thereof.

Another very important feature of the invention consists in mounting the cooperating supports on a bearing member which is rotatable about a vertical axis and provided with a gear wheel which engages with a rack which is movable by a piston in a pneumatic or hydraulic cylinder so as to turn the bearing member and the cooperating supports thereon at a certain angle which is determined by a stop and corresponds to the deviation of the longitudinal axis of the place in which a candy of a noncircular cross section is to be deposited in the candy box from the axis of this candy while held between the cooperating supports before being turned. Of course, when round candies are to be inserted in a candy box, the cooperating supports need not be turned.

Still another feature of the invention consists in the provision of suitable means which insure that the cooperating supports will be pivoted apart so as to release a candy to drop downwardly only when the particular place in which this candy is to be deposited in a candy box is located exactly underneath the cooperating supports. These means preferably consist of a pneumatic or hydraulic cylinder, the piston of which is connected to the cooperating supports so as to open the same by positive action when a candy box travelling along a conveyor underneath the cooperating supports engages upon and actuates a control switch which causes a pressure fluid to be supplied to the cylinder.

These and additional features and advantages of the present invention will become more clearly apparent from the following detailed description thereof which is to be read with reference to the accompanying drawings, in which:

FIGURE 1 shows a diagrammatic perspective layout of the packing mechanism according to the invention;

FIGURE 2 shows, partly in section, a side view of the mechanism according to FIGURE 1;

FIGURE 3 shows, partly in section, a side view of a feeding conveyor similar to the conveyor as shown in FIGURE 2;

FIGURE 4 shows a cross section which is taken along the line I—I in FIGURE 3;

FIGURE 6 shows a front view of the metering device as seen in the direction of the arrows II—II in FIGURE 5; while

FIGURE 8 shows a diagrammatic perspective view of a portion of the packing mechanism according to an alternative embodiment of the present invention;

FIGURE 9 shows a diagrammatic perspective view of a portion of the packing mechanism according to an additional alternative embodiment of the present invention.

Figure 5:
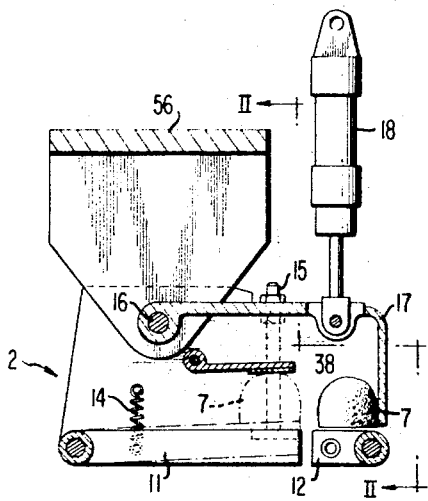
FIGURE 5 shows, partly in section, a side view of the metering device according to FIGURE 2.

As illustrated particularly in FIGURE 1, the candy packing mechanism according to the invention essentially consists of a feeding conveyer 1, a metering device 2, and a depositing device 3 which are associated with a conveyer belt 5 which extends substantially at right angles to the direction of the feeding conveyer 1 and the metering device 2 and is movable continuously in the direction of the arrow 4 so as to convey a series of candy boxes 6 in which candies of different dimensions are to be deposited. Each packing mechanism 1 to 3, only one of which is illustrated, forms a unit which only serves for depositing one piece of candy 7 of substantially the same dimensions in each of the candy boxes 6. For depositing the other candies in each box 6 until it is filled, additional packing units of the same kind as shown in FIGURE 1 are therefore required which are located at different stations along the conveyer belt 5 and each of which is adjusted for depositing one candy of specific dimensions in each candy box 6.

In each of these packing units or stations, the individual pieces of candy 7 are conveyed on the feeding conveyer 1 in the direction as indicated by the arrow 8. This conveyer 1 comprises one or more continuously-driven narrow belts 9, the upper surface of which carrying the candy is normally disposed at a level above that of the upper edges of a pair of parallel supporting rails 10 at both sides of the belts 9. By means of eccentric driving means, not shown in FIGURE 1, these supporting rails 10 are adapted to be intermittently lifted for such a distance that their upper edges will project above the conveyer belts 9 and the pieces of candy 7 will then rest in a fixed position on the rails 10. From the conveyer 1 the individual candies 7 are passed to the metering device 2 which consists of two pairs of lateral supporting rails 11 and 12 and the short conveyer belt or belts 9 between these rails. The supporting rails 11 are pivotable upwardly about a pivot 13 and are pressed by a spring 14 against the lower ends of a pair of rods 15 which are rigidly connected to an angular stop lever 17 which is pivotable about an axis 16 and the vertical end of which may be pivoted upwardly and downwardly by the movement of a piston in a cylinder 18 which may be operated, for example, pneumatically.

The metering device 2 is followed by the depositing device 3 which comprises a pair of cooperating supports 19 which are provided on the inside with a downwardly tapering lining, not shown, which is adapted to the outer shape of the candy 7 so that, after the stop lever 17 has been lifted from the metering device 2 and a piece of candy 7 has been moved by the belts 9 between the supports 19, this candy will be centered between the supports and thus located in a definite position. The cooperating supports 19 are pivotable on a supporting member 20 about horizontal pivots 21 and may be opened by the movement of a piston in a cylinder 22 and a connecting rod 23 on this piston. The supporting member 20 is further provided with a gear wheel 24 which is in engagement with a rack 25 which may be moved back and forth by a piston in a further cylinder 26 and is adapted to turn the supports 19 until an adjustable setscrew 27 abuts against a fixed stop 28.

When the candies 7 are fed along the conveyer 1 to the metering device 2, they are further moved by the belts 9 until the first piece abuts against the vertical part on stop lever 17. The fixed supporting rails 12 of the metering device 2 have a length which substantially corresponds to the length or the diameter of a candy 7 so that, when the candies 7 have been fed by the conveyer belts 9 so as to abut against each other on the metering device 2, only the first candy which abuts against the stop lever 17 will be located above the fixed rails 12, whereas the next candy behind it will lie above the pivotable supporting rails 11.

In FIGURE 1 it is assumed that, when the supports 19 have received a candy, this candy lies between the supports in the same position as indicated in dotted lines in which it is subsequently deposited in the box 6. This applies primarily if the candy has a round horizontal cross section. If, however, the candies are elongated or have another noncircular cross section, the supports 19 after receiving a piece of candy 7 must be turned by a movement of the piston in cylinder 26, the rack 25, and the gear wheel 24 to the particular position which is in accordance with the deviation of the longitudinal axis of the intended receiving position for the candy in the box, for example, a diamond-shaped receiving recess, from the axis of the candy while lying between the supports in the unturned position in which it has been delivered thereto by the metering device 2. The most suitable position of the supports 19 in the unturned condition above the box 6 may be attained by an adjustment of the entire packing unit or station. This, however, requires that all boxes 6 will travel in identical positions underneath the depositing device 3 of the respective packing station.

When a box 6 reaches the position in which its place of deposit for the candy which is held by the supports 19 is located directly underneath the supports, the corner of the box will actuate a switch 29 which is mounted on the frame of the conveyer belt 5 and has previously been adjusted thereon to the proper position. This actuation of switch 29 causes compressed air to be passed into the inlet 30 of cylinder 22 so that the connecting rod 23 will be moved downwardly and thereby pivot the supports 19 to the open position. Near the end of this downward movement of conecting rod 23, a stop member 31 thereon will engage with and actuate a switch 32 which effects the return movement of the connecting rod 23 and the closing of the supports 19 by the passage of compressed air into the other inlet 33 of cylinder 22 and by means of springs, not shown. Near the end of the return movement of the connecting rod 23 to the position as shown in FIGURE 1, the stop member 31 on rod 23 actuates another switch 34 which causes compressed air to be passed to the inlet 35 of cylinder 26 so that rack 25 is moved away from its previous position in engagement with stop 28 and thereby turns the gear wheel 24 and thus the supports 19 back to the position as illustrated. When the supports 19 reach this position, another stop which is connected to the setscrew 27 will actuate a switch 36 which causes compressed air to be passed to the inlet 37 of cylinder 18 so as to pivot the stop lever 17 upwardly and thereby permit the next candy 7 above the supporting rails 12 to slide from the end of belts 9 between the supports 19. As may be seen in FIGURE 2, the supports 19 are spaced at a short distance from the end of the conveyer belts 9 and the rails 12. In FIGURE 1, this distance is exaggerated solely for the purpose of illustration.

When the stop lever 17 is pivoted upwardly, rods 15 which are secured to this lever are likewise lifted and thereby permit the supporting rails 11 to be pivoted by spring 14 toward a brake plate 38. The next piece of candy which was previously located adjacent to the candy which has just been passed between the supports 19 will thereby be lifted off the belts 9 and pressed against the brake plate 38 and thus prevented from any further movement. At the same time, the actuation of switch 36 energizes a timing relay 39 which after a certain length of time depending upon the kind of candy to be deposited in a box 6 causes compressed air to be passed to the inlet 40 of cylinder 18, whereby the stop lever 17 is pivoted downwardly to its original position. The next piece of candy 7 will then be moved in the same manner as previously described above the fixed supporting rails 12 against the vertical stop on the end of this lever 17.

If candies of a noncircular cross section are to be deposited in the boxes 6 and the cooperating supports 19 must therefore be turned about a vertical axis relative to their receiving position as shown, a stop member 41 is to be secured to the connecting rod of cylinder 18 in such a position that, when stop lever 16 returns to its lowest position, this stop member 41 will actuate a further switch 42 which causes compressed air to be passed to the inlet 43 of cylinder 26, so that rack 25 will then be moved and thereby turn the supports 19 until setscrew 27 engages against the stop 28. The packing mechanism of this station then remains in this position until the edge of the next box 6 traveling along the conveyer belt 5 abuts against and again actuates the switch 29 and thereby starts again the entire cycle of operations.

FIGURE 2 illustrates an actual embodiment of the packing mechanism according to the invention as shown diagrammatically in FIGURE 1. In FIGURE 2 it may be seen that the individual elements of the mechanism as shown in FIGURE 1 are mounted by means of supporting bars, straps, brackets, or the like on a common support as indicated in FIGURE 1 in dot-and-dash lines. The conveyer belts 9 of the feeding conveyer 1 are driven by a motor 44 and several driving belts 45 to 47. Driving belts 45 and 46 drive a drive pulley 48 which, in turn, drives the conveyer belts 9. As shown in FIGURES 2 and 3, drive pulley 48 is mounted on a central axis, while the two guide pulleys 49 at the outer ends of the conveyer 1 are eccentrically mounted so that at each revolution of these guide pulleys the conveyer belts 9 are lifted once above the upper surface of the supporting rails 10. It is, however, also possible, as shown in FIGURE 9, to mount the drive pulley 48' so as to be rotatable about an eccentric axis, while the guide pulleys 49' are mounted on central axes, so that at each revolution of drive pulley 48 the conveyer belts 9 will be tightened and loosened which likewise causes the belts to be lifted and lowered. Instead of lifting and lowering the conveyor belts relative to the supporting rails 10, it is also possible to reverse the arrangement by lifting and lowering the supporting rails 10 relative to the upper surface of the belts by means of one or more driven eccentrics, as illustrated in FIGURE 8, wherein eccentrics 111 are in direct contact with the supporting rails 110 and are thus operable to raise and lower the supporting rails. According to this arrangement the belts are driven by non-eccentric drive pulleys 149.

FIGURE 3 illustrates a feeding conveyer similar to that as shown in FIGURE 2 but differing therefrom slightly at least insofar as its outer dimensions are concerned. The guide pulleys 49 and the drive pulley 48 are, however, mounted in the same manner as shown in FIGURE 2.

FIGURE 4 illustrates that the supporting rails 10 including the conveyer belts 9 and their driving means are mounted at the inside of U-shaped guide rail 50 which is secured by screws to the common support, as previously mentioned. The conveyer belts 9 and the supporting rails 10 are movably mounted on vertical rods 51 projecting through apertures 53 in the U-shaped guide rail 50 and are pressed upwardly by springs 52. If the feeding conveyer 1 is, however, filled consecutively with candies arriving one after the other, rods 51 will be pushed downwardly since springs 52 are easily compressible, and a connecting bar between rods 51 will then act upon a limit switch which will then interrupt the further supply of candies to the feeding conveyer 1 In this manner it is possible to prevent the candies from abutting against each other on the feeding conveyer and from thereby possibly damaging each other.

FIGURE 5 shows an enlarged view of the metering device 2 of each packing station. The pivotable supporting rails 11 are shown in solid lines in their normal position and in dot-and-dash lines in their upwardly pivoted position. This drawing shows clearly that the candies 7 are lifted by the supporting rails 11 off the conveyer belts 9 and are pressed against the brake plate 38. The metering device 2 is secured to the common support by means of a connecting bracket 56.

Figure 6:
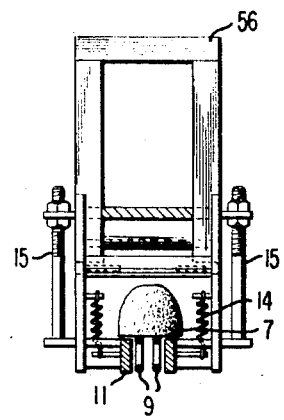

FIGURE 6 illustrates the manner in which the candies 7 rest upon the conveyer belts 9 or the supporting rails 11. By means of the rods 15 which are connected to the stop lever 17, these rails 11 are pressed downwardly against the action of the springs 14 so that the piece of candy 7 rests on the conveyer belts 9 in the position as illustrated.

Figure 7:
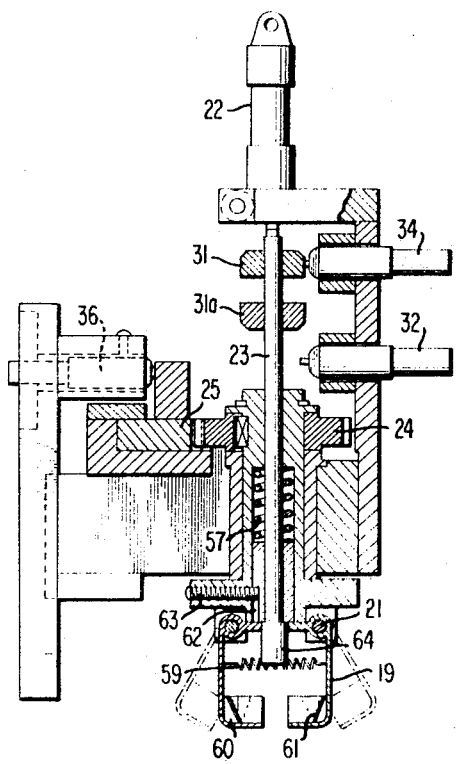
FIGURE 7 shows a partial cross section which is taken along the line III—III in FIGURE 2.

FIGURE 7 shows the manner of mounting and operating the cooperating supports 19. When the connecting rod 23 is lowered by the operation of cylinder 22, it presses by means of a spring 57 upon a bushing 58 which rests on the edges of the upper inwardly-bent parts of supports 19 and thereby pivots the supports apart to the position as indicated in dotted lines. When the connecting rod is again drawn upwardly, supports 19 will be closed by the action of a tension spring 59. Supports 19 are provided on the inside with a lining 60 which is of a shape in accordance with the outer surface of a candy 7 and provided with downwardly tapering side walls 61 which permit certain variations in the dimensions of the candies to be compensated and thus insure that each candy will be properly centered within the lining 60 between the supports 19.

Bushing 58 is provided with a groove 62 into which a screw 63 engages so as to prevent the bushing from turning. The lower end of connecting rod 23 is enlarged so as to form an ejector 64 which is adapted to eject the candy in the downward direction in the event that, when the supports 19 are opened, the candy, for example, one wrapped in tinfoil, will stick to the supports instead of immediately dropping out of the supports. The ejector 64 therefore insures that the candy will be positively ejected from the supports 19. After the supports 19 are pivoted back to their closed position, there can thus be no danger that a candy or parts thereof might still remain between the supports 19 and prevent the next candy from sliding between them.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A packing mechanism comprising a feeding conveyer having at least one belt movable in a feeding direction and adapted to carry a series of individual articles of substantially equal dimensions one behind the other, gripping means adjacent to one end of said conveyer adapted to grip and release one of said articles, driving means for opening and closing said gripping means, metering means near said end of said conveyer and spaced from said gripping means and movable to two positions so as to hold one of said articles in one position and then to release the same in the other position so as to pass into said gripping means, driving means for moving said metering means from one to the other of said two positions, adjustable means for turning said gripping means back and forth about a vertical axis so as to permit the articles within said gripping means to be dropped therefrom and deposited in a position at an angle to said feeding direction in which it has been received by said gripping means from said metering device, and driving means for said turning means, in which said conveyer belt is movable continuously in said feeding direction, said feeding conveyer further comprising supporting rails at the lateral sides of said belt, and elevating means for intermittently varying the levels of the upper surfaces of said belt and of said supporting rails relative to each other so that when said articles rest on said belt, they are moved in said feeding direction and when they rest on said supporting rails, their feeding movement is stopped, and in which said supporting rails are mounted in a fixed position, said elevating means comprising eccentric pulleys at least at the opposite ends of said conveyer for supporting and guiding said conveyer belt and for raising and lowering the same at each revolution of said pulleys, and means for continuously driving said conveyer belt.

2. A packing mechanism comprising a feeding conveyer having at least one belt movable in a feeding direction and adapted to carry a series of individual articles of substantially equal dimensions one behind the other, gripping means adjacent to one end of said conveyer adapted to grip and release one of said articles, driving means for opening and closing said gripping means, metering means near said end of said conveyer and spaced from said gripping means and movable to two positions so as to hold one of said articles in one position and then to release the same in the other position so as to pass into said gripping means, driving means for moving said metering means from one to the other of said two positions, adjustable means for turning said gripping means back and forth about a vertical axis so as to permit the articles within said gripping means to be dropped therefrom and deposited in a position at an angle to said feeding direction in which it has been received by said gripping means from said metering device, and driving means for said turning means, in which said conveyer belt is movable continuously in said feeding direction, said feeding conveyer further comprising supporting rails at the lateral sides of said belt, and elevating means for intermittently varying the levels of the upper surfaces of said belt and of said supporting rails relative to each other so that when said articles rest on said belt, they are moved in said feeding direction and when they rest on said supporting rails, their feeding movement is stopped, and in which said supporting rails are mounted in a fixed position, guide pulleys at least at the opposite ends of said conveyer for supporting and guiding said conveyer belt, and an eccentric drive pulley for driving said conveyer belt and for tightening and loosening the same and for thereby raising and lowering its upper surface relative to the upper surface of said supporting rails at each revolution of said drive pulley.

3. A device for handling and positioning fragile articles within containers or the like, comprising
  feeding conveyer means having at least one belt movable in a feeding direction and adapted to carry a series of individual articles of substantially equal dimensions one behind the other,
  metering means near the end of said feeding conveyer means to which the articles are carried, said metering means movable to two positions so as to retain one article in one of said two positions and to release said article in the other of said two positions,
  driving means for actuating said metering means from one to the other of said two positions,
  positioning means, including plural cooperating support means, relatively movable with respect to each other, adapted to receive an article released by said metering means and to deposit said article in a predetermined position and orientation, said cooperating support means providing support for said article primarily upon the bottom and lower lateral surfaces thereof, and driving means for imparting relative motion to said plural cooperating support means, wherein said driving means for said plural cooperating support means includes means for rotating said support means together about a vertical axis to predetermined angular positions and means for rotating said support means oppositely about horizontal axes, thus effecting an opening and closing of said support means.

4. A device according to claim 3, further comprising a lining on the inner surfaces of said plural cooperating support means, which, in the closed position thereof, has a shape substantially corresponding to the shape of one of the articles to be positioned, but tapering slightly in the downward direction of said support means.

5. A device according to claim 4, wherein said metering means includes an endless conveyer, a pivotably arranged distributing lever and retaining means which together arrest the motion of all of said articles with the exception of the forwardmost article, which article is released by said distributing lever and received by said plural cooperating support means.

6. A device according to claim 5, wherein said retaining means includes a stationary plate-like member positioned above said endless conveyer of said metering means and support rails positioned closely adjacent said endless conveyer and adapted to be elevated with respect thereto, thus removing an article from said endless conveyer means, said elevation of said support rails being effected simultaneously with the pivoting of said distributing lever.

7. A device according to claim 6, further comprising eccentric driving means acting upon said support rails for raising and lowering same, means for continuously driving said conveyer belt, and means for driving said eccentric means at a speed in a predetermined proportion to the speed of said conveyer belt.

8. A device according to claim 7, wherein said retaining means is spaced from said distributing lever by a distance substantially equal to the length of one of the articles to be positioned, so that when said distributing lever is pivoted upward, releasing the articles adjacent thereto to pass between said plural cooperating support means, only one article will be so advanced.

9. A device according to claim 8, wherein said retaining means further comprises at least one spacing member secured to and projecting downwardly from said distributing lever and having a free end abutting upon said support rails to retain said rails below the level of said endless conveyer belt when said distributing lever is in a lowered position, and spring means acting upon said support rails for elevating said rails, thus retaining at least one article thereon against said plate-like member with a slight pressure when said distributing lever is in an upper position, permitting passage of an article to said plural cooperating support means.

10. A device according to claim 9, wherein said plural cooperating support means further comprises a bearing member rotatable about a substantially vertical axis, means for pivotally connecting said cooperating support means to the lower end of said bearing member so as to be pivotable relative to each other about horizontal axes, a rod extending through said bearing member and slidable in the axial direction relative thereto and having a lower end connected to said cooperating support means, said driving means for said plural cooperating support means being connected to the upper end of said rod for reciprocating said rod in said axial direction for pivoting said plural cooperating support means so as to open and close same, said means for rotating said support means together about a vertical axis comprising a gear wheel secured to said bearing member, a rack engaging with said gear wheel, driving means for reciprocating said rack in its longitudinal direction, for limiting the extent of movement of said rack and for thereby defining said angular movement of said plural cooperating support means, and means for adjusting said limiting means so as to predetermine the extent of angular movement.

11. A device according to claim 4, in which each of said driving means comprises a cylinder, and a piston slidable in said cylinder, pressure supply means for supplying a pressure fluid to said cylinder so as to act upon said piston, and control means for actuating each of said pressure supply means in a predetermined timed relationship.

References Cited

UNITED STATES PATENTS

| 2,286,603 | 6/1942 | Coumbe et al. | 198—34 |
| 2,878,919 | 3/1959 | Jones | 198—34 |
| 3,191,357 | 6/1965 | Hawley et al. | 53—240 |
| 3,191,358 | 6/1965 | Scherr et al. | 53—240 |
| 3,217,859 | 11/1965 | Bartlo et al. | 198—34 |
| 3,319,396 | 5/1967 | Hofer et al. | 53—240 |

FOREIGN PATENTS 53,978   12/1938   Norway.

RICHARD E. AEGERTER, *Primary Examiner.*

U.S. Cl. X.R.

53—238; 198—20